(12) United States Patent
Delgado Acarreta et al.

(10) Patent No.: US 11,209,239 B2
(45) Date of Patent: Dec. 28, 2021

(54) FIREARM STOCK

(71) Applicant: Rade Tecnologías, S.L., Saragossa (ES)

(72) Inventors: Raúl Delgado Acarreta, Saragossa (ES); Rubén Robles Pérez, Saragossa (ES); Daniel Osuna Sanz, Saragossa (ES); José Cuesta Álvarez, Saragossa (ES)

(73) Assignee: Rade Tecnologías, S.L., Saragossa (ES)

( * ) Notice: Subject to any disclaimer, the term of this patent is extended or adjusted under 35 U.S.C. 154(b) by 695 days.

(21) Appl. No.: 16/071,211

(22) PCT Filed: Jan. 19, 2016

(86) PCT No.: PCT/ES2016/070019
§ 371 (c)(1),
(2) Date: Jul. 19, 2018

(87) PCT Pub. No.: WO2017/125618
PCT Pub. Date: Jul. 27, 2017

(65) Prior Publication Data
US 2021/0199403 A1 Jul. 1, 2021

(51) Int. Cl.
*F41C 23/00* (2006.01)
*F41A 9/53* (2006.01)
*G06F 3/14* (2006.01)

(52) U.S. Cl.
CPC ............... *F41C 23/00* (2013.01); *F41A 9/53* (2013.01); *G06F 3/14* (2013.01)

(58) Field of Classification Search
CPC ............... F41C 23/00; F41A 9/53; G06F 3/14

USPC ......... 42/75.03, 1.05, 1.01, 1.02, 1.03, 1.04; 370/360
See application file for complete search history.

(56) References Cited

U.S. PATENT DOCUMENTS

| | | | | |
|---|---|---|---|---|
| 4,793,085 A | * | 12/1988 | Surawski | F41A 19/58 42/1.05 |
| 4,829,692 A | * | 5/1989 | Guild | F41A 17/00 340/540 |
| 5,799,433 A | * | 9/1998 | Danner | F41A 9/53 42/1.05 |
| 6,311,682 B1 | | 11/2001 | Rice et al. | |

(Continued)

OTHER PUBLICATIONS

NPL: https://www.thetruthaboutguns.com/gear-review-burris-speedbead-first-impressions/ Sep. 11, 2011.*

(Continued)

*Primary Examiner* — John Cooper
(74) *Attorney, Agent, or Firm* — Conley Rose, P.C.; J. Robert Brown, Jr.

(57) ABSTRACT

Firearm stock of the type which comprise an electronic control unit in said stock and comprising a receptacle with at least one opening in the stock comb and which is configured to receive a display device. It also comprises a battery configured to be connected to the display device and a control unit configured to receive data from the electronic control unit and send it to the display device. When the display device is installed it is housed in the receptacle and the user has visual access to it by the opening of the comb so that he has access to all the firearm information in his own line of sight when he is aiming. Furthermore, the stock is equally valid for left and right-handed people.

12 Claims, 3 Drawing Sheets

(56) References Cited

U.S. PATENT DOCUMENTS

| | | | |
|---|---|---|---|
| 6,523,296 B1 | 2/2003 | Constant et al. | |
| 8,827,706 B2 * | 9/2014 | Hogan, Jr. | F41B 11/50 434/18 |
| 10,488,151 B1 * | 11/2019 | Casey | H04N 5/23293 |
| 2007/0115955 A1 * | 5/2007 | Byer | G06F 1/163 370/360 |
| 2008/0039962 A1 * | 2/2008 | McRae | G01S 17/88 700/90 |
| 2009/0077855 A1 * | 3/2009 | Pritchett | F41G 11/003 42/90 |
| 2009/0287363 A1 * | 11/2009 | Young | F41C 23/16 701/2 |
| 2011/0067282 A1 * | 3/2011 | August | F41A 19/01 42/1.03 |
| 2011/0173869 A1 * | 7/2011 | Uhm | F41G 3/165 42/111 |
| 2012/0110884 A1 * | 5/2012 | Criswell | F41C 23/14 42/73 |
| 2013/0263489 A1 * | 10/2013 | Troy | F41C 23/22 42/71.01 |
| 2014/0173964 A1 * | 6/2014 | Mizrachi | F41A 33/02 42/90 |
| 2014/0230296 A1 * | 8/2014 | Kuparinen | F41A 17/06 42/1.01 |
| 2014/0366419 A1 * | 12/2014 | Allan | F41A 17/063 42/70.06 |
| 2014/0378088 A1 | 12/2014 | Goel et al. | |

OTHER PUBLICATIONS

International Search Report for PCT/ES2016/070019 dated Aug. 3, 2016.

Beretta: "Gunpod 2", Manual, 2015, Italy.

* cited by examiner

FIREARM STOCK

CROSS-REFERENCE TO RELATED APPLICATIONS

This application is a National Stage of International Application No. PCT/ES2016/070019, filed on Jan. 19, 2016, which is hereby incorporated by reference in its entirety.

OBJECT OF THE INVENTION

The present invention is included within the technical field of accessories for small arms.

More specifically, it discloses a firearm stock comprising, in its comb, a display device which allows the user to obtain, in a single glance, information about the firearm he is using.

BACKGROUND OF THE INVENTION

The essential parts of all small arms include a barrel and a firing mechanism. Likewise, small arms may comprise additional elements such as, for example, bullet counting devices, user identification devices, aiming devices, display devices, etc.

The additional devices of this type of firearms which may be either integrated in them or connected by means of an accessory which is mounted on them, must fulfil the requirement of not negatively interfering with their mechanisms or with access to the firearm by the user handling them.

The current market trend is that of adding electronics related to the previously described additional elements. Furthermore, in the case of firearms comprising display devices, users have the possibility to know all the information of the firearm related to its other devices.

From the state of the art document U.S. Pat. No. 7,818, 910 is known, which discloses systems, apparatus and methods for communicating with a robot via a weapon. The firearm comprises a receiver assembly which is joined to one end of the firearm barrel and the handgrip. The receiver assembly is configured to send signals to a robot which responds depending on the signal received.

Likewise, document US2007115955 is known which discloses an apparatus integrated in a firearm which allows communication of voice and data, a navigation component to determine the location of the person carrying the firearm and an external central processor in communication with them. The key of this invention is to send information from the central processor to the user to alert to possible hazards or to information on the terrain he may find around him.

Another known document in the state of the art is U.S. Pat. No. 8,176,667 which comprises a plurality of elements intended to count the bullets fired with a firearm. The device enables to detect when a bullet has been fired and determine, according to the number of shots detected, how many bullets are available. The number of bullets still available is shown to the user on a screen which is disposed on a side of the firearm.

Generally, despite the fact that the firearms known in the state of the art incorporate control electronics which make it possible, for example, to detect the number of available bullets, the user does not have access to such information. Some firearms are known, as previously described, comprising screens to facilitate the display of the information. However, those firearms have the screens placed on the area of the handgrip or on the sides, which means the user does not have visual access to the information they show.

A known solution of the state of the art is to install screens on the sides which can rotate around an axis placed in the firearm body to remain sloping or perpendicular with respect to the firearm side. This way, the user has access to the information on the screen at the time of firing. The technical problem with this solution is that when the screen is unfolded the user loses vision of the terrain (it is concealed by the unfolded screen). To resolve this, some firearms of the state of the art have included this type of screen on each one of the sides. This way, the user unfolds the one which is best for him.

This solution makes firearm manufacturing more expensive and adds additional elements which comprise parts that may become dirty and wear out easily because of rotation, thereby worsening their operation. Furthermore, the user must waste time in unfolding the screen he wants at any given time and that makes him lose concentration on aiming and time that may be essential for getting an accurate shot, for example, a moving target. Likewise, in many cases the user will have to confirm that despite the movement of the screen, the gun sight continues aiming at the target and whether it is necessary to aim again.

In other cases, the firearm can have support devices installed in it wherein a telephone, a tablet, etc. are placed when the user so wants and which allow the user to obtain information that is sent to a robot or an external computer.

In other words, as a general outline, there are in the state of the art two preferred locations for display devices in firearms.

A first solution corresponds to the location in areas outside the original morphology of the firearm. The problem associated with this solution is that the sighting elements of the firearm are altered or inhibited. Furthermore, the placement of external display devices may harm the firearm ergonomics, both due to the increase in weight and its distribution. The morphology of the firearm is also modified which may also affect the aiming of the firearm.

A second solution corresponds to the execution of substantial modifications to the original morphology of the firearm by making, a posteriori, receptacles to house display devices. The technical problem with this solution is that these firearms are very sensitive to bumps produced on shooting and they alter the original morphology of the firearm, etc.

DESCRIPTION OF THE INVENTION

The present invention proposes a firearm stock, preferably of long gun, comprising at least one receptacle with a display device disposed on the stock comb. This allows solving the previously described drawbacks of the firearms of the state of the art since the original comb of the stock of a firearm is replaced in the stock described by a comb which already comprises the receptacle and the display device.

Other advantages associated with this solution are that it is not necessary to place the display device outside the firearm nor is it necessary to make modifications in the original morphology of the firearm.

Preferably, the invention proposed is designed for the installation of a display device in long guns, such as, for example, shotguns or rifles, or in small arms such as pistols, in both cases for the civil sector.

In the case of the civil sector, restrictions on size, weight and ergonomics for display or warning devices are less limiting than when it relates to firearms intended to the military sector. Furthermore, in the civil sector, display or warning devices are more greatly used since it is a sector with less specialization and any type of information may be helpful for the users. On the other hand, the military sector is a more specialized sector which does not require this type of devices.

As previously described, electronic control units included in this type of firearms are already known in the state of the art, which allow to control, for example, the number of cartridges that remain, to identify the firearm user, etc. but with those electronic control units the user could not interact with the firearm according to such information.

What is achieved with the firearm stock of the present invention is that the user has access to all the firearm information such as, whether it is activated, loaded, the number of cartridges it has, etc.

The users that purchase long guns with wooden stocks do not want to add later any additional element to the stock that may damage it, because it is very complicated to make modifications to the wooden stock, and that is why it is necessary to have a stock capable of housing a display device without having to modify it.

There are multiple reasons not to make any modification to the firearm. One of them, for example, would be not to introduce in the stock of a firearm that is going to last many years any type of device which may quickly become obsolete.

Another reason would be not to decalibrate the firearm which has left the factory or the workshop with perfect calibration and acting on it a posteriori may decalibrate it. For example, if a receptacle is made in the stock and it is not made symmetrically, the weight reduced in one of the sides more than in the other or the extra weight added when installing an additional device could modify the firearm dynamics.

The stock of the present invention is intended to be installed in a firearm of the type which comprise the electronic control unit in the stock. In this case the stock comprises by default at least one receptacle, disposed at least partially on the stock comb and which is configured to receive a display device. Likewise, it comprises the display device which is housed in the receptacle and which comprises a screen that is located on the stock comb.

The stock also comprises a battery, configured to be connected to the display device, and a control unit configured to receive data from the firearm electronics and send it to the display device.

In the case of the firearms of better category, these usually have built-in protections in the stock comb which are generally made of rubber and height-adjustable. The stock of the present invention comprises the display device in the comb, and furthermore, the other elements which may comprise a stock of the state of the art.

One of the most important advantages of the present invention is that the stock of the firearm already leaves the factory configured to receive a display device. Thus, no further action has to be performed in the stock in order to include said device or to replace it in the event that it becomes obsolete or gets damaged after its installation.

Another important advantage of the present invention is that the display device is disposed in the stock comb, in such a way that it is in the line of sight of the user when he is aiming. Therefore it is valid for ambidextrous since it does not matter where the firearm is held. At all times, irrespective of the arm holding the firearm, the user has visual access to all information of the display device.

This is a great advantage compared with stocks of firearms of the state of the art comprising screens on the sides of the stock. With said firearms, when the user wants to see what is shown on the screen he has to turn the firearm and loses his aim and the position already gained. After looking at the screen the user has to aim again. Therefore, every time the user wants to see what is shown on the screen he loses a lot of time and concentration.

Preferably, the firearm stock of the present invention comprises the display device integrated from its manufacture to avoid the previously described problems related to the later installation of this device.

Another important advantage of the present invention is that the measurements of the firearm are maintained since the display device is integrated in a receptacle of the stock itself. It is not an additional element that is incorporated outside the stock and, therefore, there are no differences in external volume between the described firearm and one which does not have the display device. This is a great advantage over firearms of the state of the art wherein external display devices are placed as external adhesions to the rest of the firearm.

Likewise, the stock of the present invention provides the advantage of discretion. This advantage is also related to that described in the previous paragraph. When the display device is switched off nothing different is observed from the outside since the screen of the display device is, preferably, in line with the rest of the stock comb.

The display device may be kept switched off provided that the user so desires. It is the user himself who can decide to switch it on at the time he wants or needs to use it.

Therefore, a firearm user with the proposed stock can access at a single glance all the firearm information through the display device. Furthermore, the use of display devices in applications where they had not been used so far involves a great improvement in the perception of users who may interact with certain machines/systems with which they could not interact before. In the case of the present invention, as previously described, it makes it possible to interact with the firearm and have information of it that may be very useful to the user during handling or storage and transport.

To guarantee the ergonomics of the firearm and more specifically of its stock, the display device of the stock is custom-made. Another advantage associated to this characteristic is that it allows the user to continue to use the firearm without changing his aiming or position habits, etc. This is because there are no parts that protrude from the stock which may be a nuisance to the user.

DESCRIPTION OF THE DRAWINGS

To complement the description being made and in order to aid towards a better understanding of the characteristics of the invention, in accordance with a preferred example of practical embodiment thereof, a set of drawings is attached as an integral part of said description wherein, with illustrative and non-limiting character, the following has been represented.

PREFERRED EMBODIMENT OF THE INVENTION

Examples of embodiment of the invention are described below, with the aid of FIGS. 1 to 5.

Figure 1:
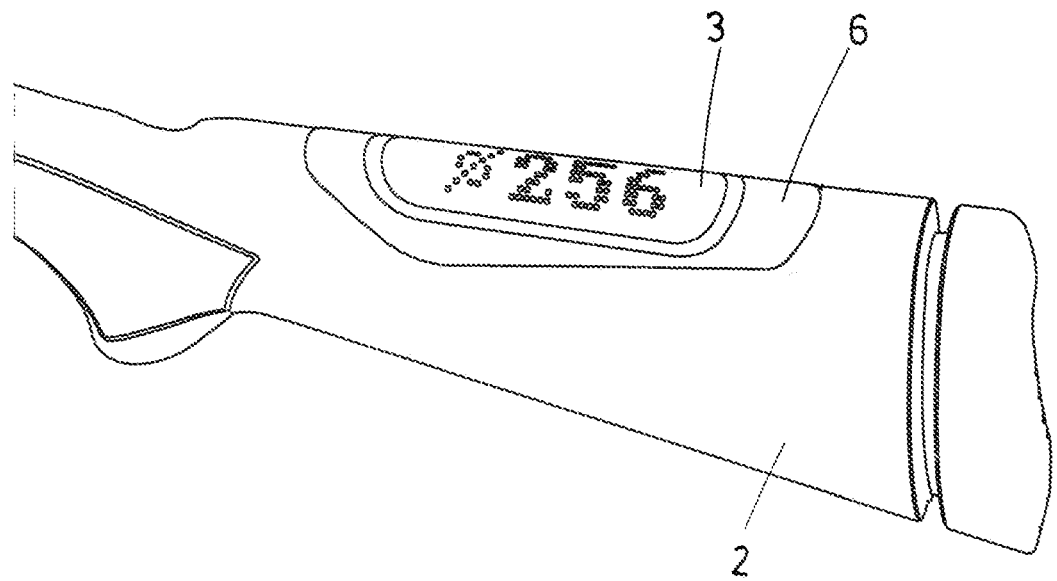
FIG. 1.—Shows a perspective view of the firearm stock of the present invention.

The firearm (1) stock (2) proposed is shown in FIG. 1. Said stock (2) comprises at least one display device (3) disposed in the comb (6), and the display device (3) comprises a screen which allows the user to have direct visual access to the information which is shown on it whilst he is aiming.

Figure 2:
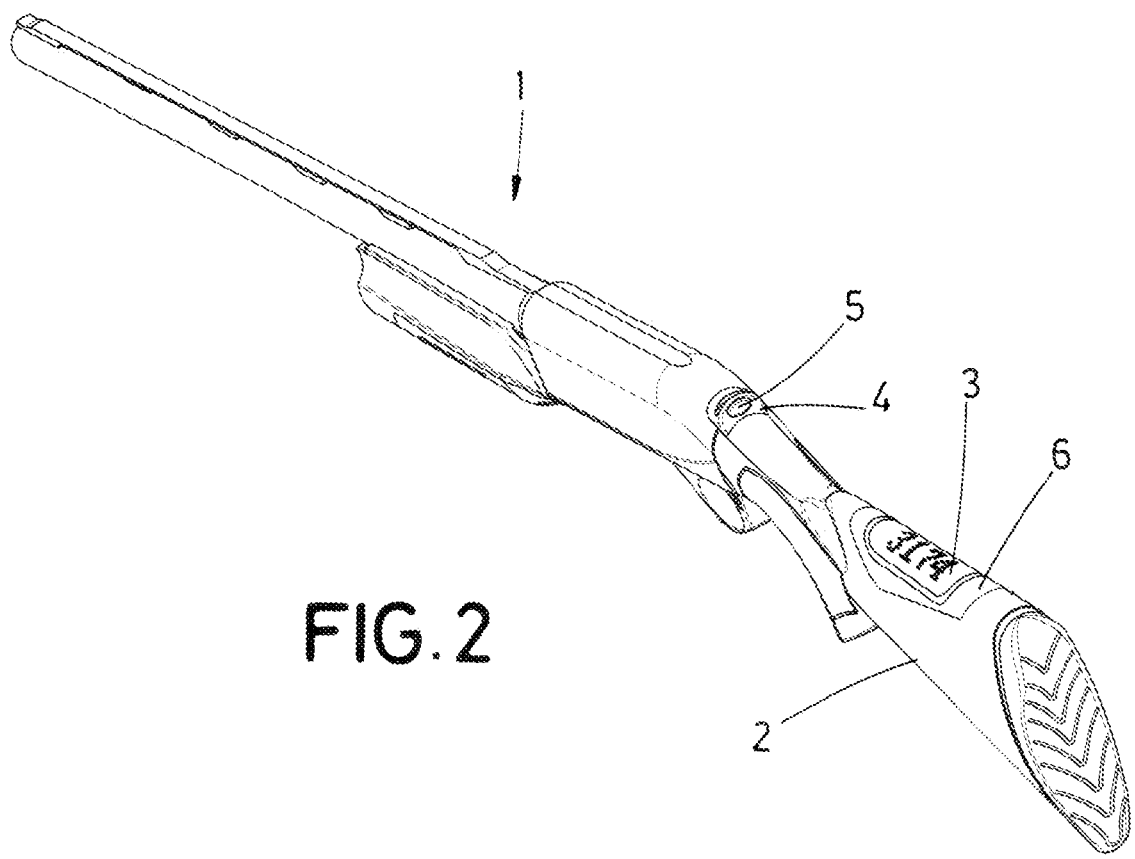
FIG. 2.—Shows a perspective view of a firearm with the firearm stock proposed.

The firearm (1) for which the stock (2) of the present invention has been designed is of the type which comprise an electronic control unit for controlling characteristic parameters of the firearm (1), such as, the total number of shots fired, the number of shots fired in a round, the number of cartridges stored in the magazine, information about the presence or absence of cartridge in the chamber, battery level, lock or unlock state of the firearm (1), environmental data, etc. In FIG. 2, the firearm (1) can be observed with the firearm (1) stock (2) of the present invention.

The stock (2) further comprises a receptacle with at least one opening in the stock (2) comb (6) and which is configured to receive the display device (3). Likewise, the stock (2) comprises the display device (3) which is housed in the receptacle and which comprises a screen which is located on the stock (2) comb (6). The display device (3) is always disposed in the stock (2) and the electronic control unit of the firearm may also be totally or partially disposed in the stock (2). Part of the firearm (1) electronics may be located outside the stock (2), such as, the electronics related to the detection of the number of shots fired, etc.

In the stock (2) there is also a battery configured to be connected to the display device (3) and a control unit configured to receive data from the electronic control unit and send it to the display device (3).

Figure 3A:
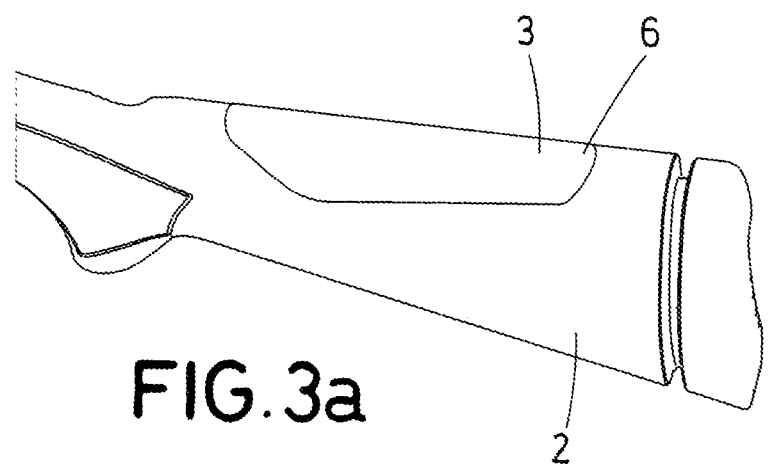
FIG. 3a.—Shows a view of the firearm stock with the display device switched off.
Figure 3B:
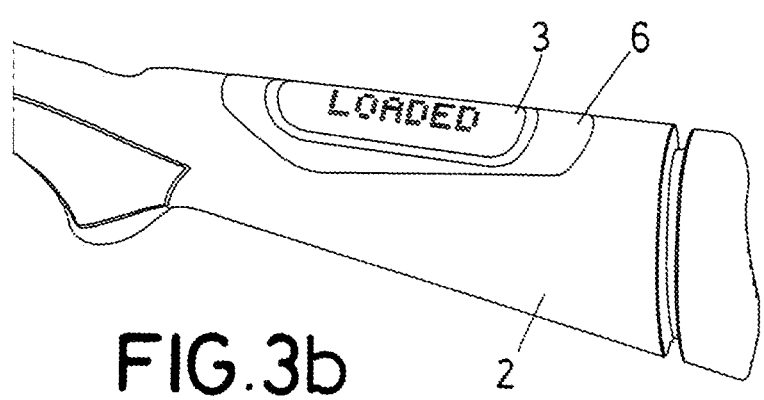
FIG. 3b.—Shows a view of the firearm stock wherein the message "LOADED" is observed in the display device.
Figure 3C:
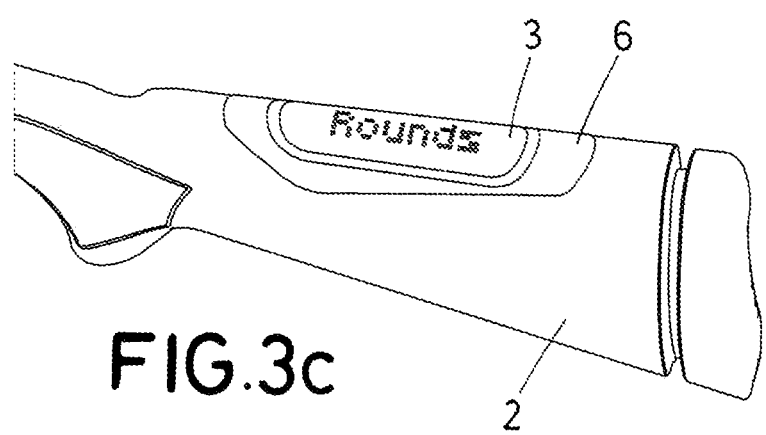
FIG. 3c.—Shows a view of the firearm stock wherein the message "ROUNDS" is observed in the display device.
Figure 3D:
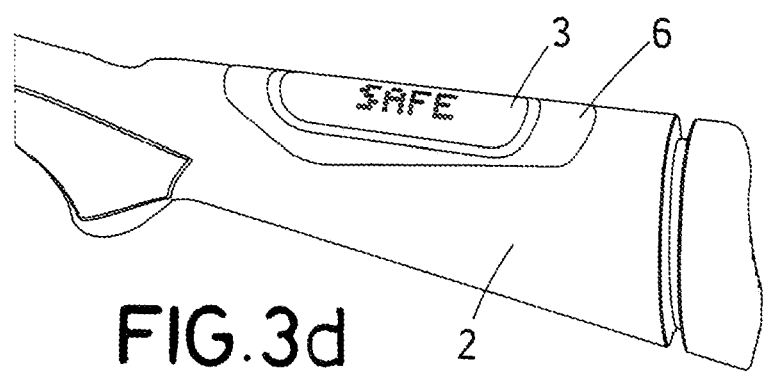
FIG. 3d.—Shows a view of the firearm stock wherein the message "SAFE" is observed in the display device.
Figure 4:
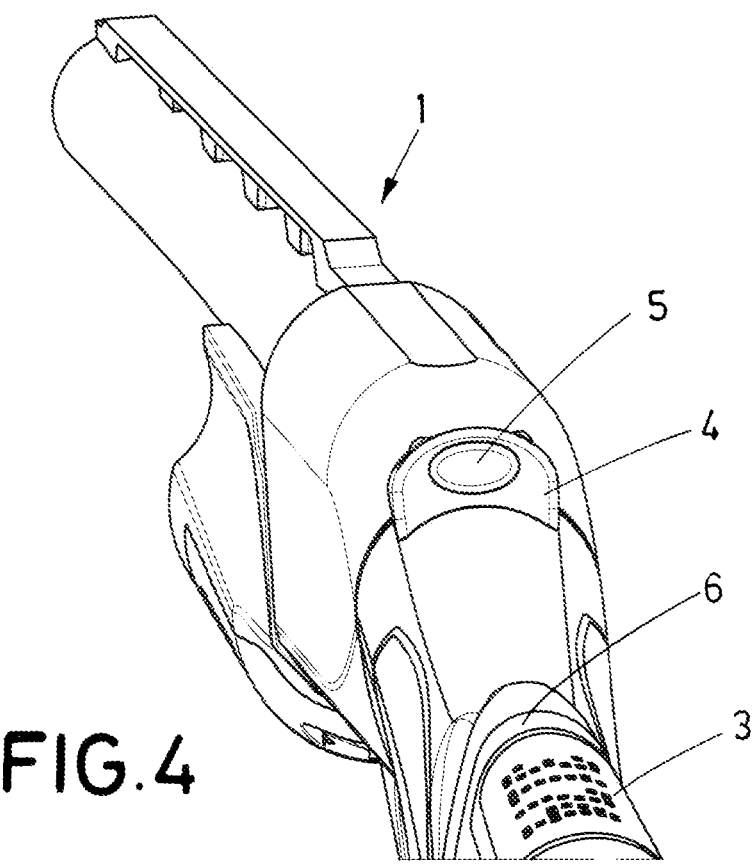
FIG. 4.—Shows, from a user's eye view, a firearm with the firearm stock proposed.

In FIGS. 3*a* to 3*d*, the display device (3) is shown at different moments of use of the firearm (1). For example, in FIG. 3*a* it can be seen a moment of use of the firearm (1) wherein the display device (3) is switched off. In FIG. 3*b* the message "LOADED" is shown which warns the user that the firearm (1) is loaded and ready to be fired. In FIG. 3*c*, the message "ROUNDS" appears which alternates during the operation of the firearm (1) with another message that indicates the number of available cartridges in the magazine. In FIG. 3*d* in the display device (3) message "SAFE" appears which informs the user that the firearm (1) is not loaded, so that it is possible to handle the firearm (1) without fear that it is shot.

Preferably, the screen is disposed in the opening of the stock (2) comb (6). The display device (3) is also preferably completely housed in the receptacle and the screen is disposed flush with the stock (2) comb (6). In this example of embodiment the display device (3) does not protrude from the firearm (1) comb (6) so that its original profile is maintained. This is an advantage for the user since he does not have to readjust to its use. Furthermore, in the absence of protruding parts in the stock (2) there is no danger of involuntary snagging.

As the display device (3) is disposed in the comb (6), it is in the line of sight of the user when he is aiming the firearm (1). This is observed, for example, in FIG. 4 where it can be seen how the user has direct visual access to the number of shots fired.

Likewise, the stock (2) may comprise an sound signal device which is located in the receptacle and connected to the control unit of the stock (2). This sound signal device allows the user to have audio information of the firearm (1), such as, for example, receiving a beep when the last cartridge has entered the chamber.

In the embodiments in which the stock (2) comprises a sound signal device it is also an advantage that it is disposed in the receptacle which is in the stock comb as it is in a position close to the user's ear.

In another example of embodiment, the stock (2) may comprise a GPS receiver, also disposed in the receptacle. This contributes to a better position signal reception since, for example, if the GPS receiver was placed on one side of the firearm (1), when the user was in a firing position he would cover the area with his arm and would worsen reception. The improvement in signal reception also allows the user to go into woods or similar spaces with poor coverage without fear of losing the position signal.

Preferably, the stock (2) also comprises a receiver and an emitter configured to send and receive information between the control unit and an external device. Said external device may be, for example, the user's mobile phone, a smart watch worn by the user, etc. The receiver and the emitter are wireless communication devices. In one example of embodiment, they may be, for example, Bluetooth® devices.

The battery inside the stock can be charged, for example, via USB connection, wirelessly placing the firearm (1) stock on an external charging base, etc.

In one example of embodiment the display device (3) may show the total shot counter, the partial shot counter, the cartridge counter, an indicator of cartridge in the chamber, the battery level, the firearm (1) status (locked or unlocked position), etc. This data is shown, for example, in FIGS. 3*b* to 3*d*.

Preferably, the display device (3) comprises a colour screen which allows the user to quickly identify the information displayed. For example in the case of the cartridge counter, the number may be shown in green when there are still several cartridges remaining, it can be shown in yellow when there are just a few cartridges left and in red when there are just one or two cartridges left. For example, in the case of FIG. 3*b* the message "LOADED" may be shown in red so that the user quickly detects that he is in a hazardous situation. The message of FIG. 3*d* "SAFE" could be shown, for example, in blue or green.

Figures 5A, 5B:
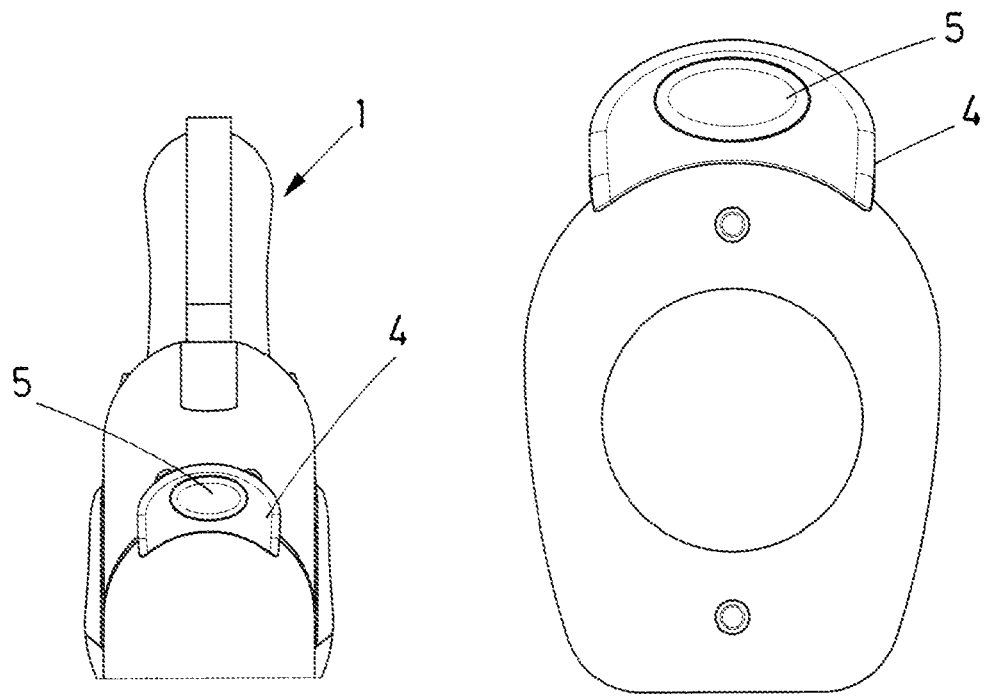
FIG. 5*a*.—Shows a detail of a firearm comprising the firearm stock of the invention with a warning piece.
FIG. 5*b*.—Shows the warning piece of FIG. 5*a*.

Additionally, the stock (2) may comprise at least one display element (5), preferably a LED, in a warning piece (4) which is joined to the front part of the stock (2), in the junction with the body of the firearm (1) as shown in FIG. 5*a*. These display elements (5), preferably LEDs, allow to alert the user about certain critical information from the firing position (when the user is aiming to fire).

Preferably, the warning piece (4), which is shown in detail in FIG. 5*b*, wherein the LEDs are disposed, is a ring-shaped piece which allows the coupling of the firearm (1) body therein for joining with the stock (2). In another example of embodiment, it is a semi-circular piece or even with some of its faces straight. Ideally the outer perimeter has a configuration adapted to the firearm (1) (especially to the configuration of the junction between the stock (2) and the firearm (1) body). Also preferably, the LEDs are disposed in the ring-shaped piece forming a light ring, which may be multi-coloured.

The user has access, thanks to the LEDs, to the critical information of the firearm (1), such as, if there is only one cartridge left, if there is one cartridge in the chamber, if the firearm (1) is locked, etc.

The warning piece (4) may comprise LEDs of different colours, to, for example, show a green light when there are several cartridges in the magazine, show a yellow light when there are few cartridges and show a red light when there are no cartridges.

Likewise, this warning piece (4) may have LEDs configured to alert when the shotgun has a cartridge in the chamber. This contributes to increasing safety in the firearm (1) handling since when it is loaded with a cartridge in the chamber it is necessary to be careful so that it does not fire involuntarily.

A case wherein this alert with LEDs is very useful is, for example, that wherein a user has left a cartridge in the firearm (1) chamber and later takes the firearm (1) and handles it without checking the chamber.

The invention claimed is:

1. Firearm stock comprising:
   a first control unit being an electronic control unit,
   a stock comb;
   a receptacle with at least one opening disposed in the stock comb and which is configured to receive a display device,
   a display device which is housed in the receptacle and comprising a screen which is situated in the opening of the stock comb, disposed flush with the stock comb, the display device being completely housed in the receptacle,
   a battery configured to be connected to the display device,
   a second control unit configured to receive data from the first control unit and send it to the display device,
   a warning piece which is joined to a front part of the stock in the junction with the body of the firearm.

2. The firearm stock of claim 1 further comprising a receiver and an emitter configured to send and receive information between the second control unit and an external device, respectively.

3. The firearm stock of claim 2 wherein the receiver and the emitter are wireless communication devices.

4. The firearm stock of claim 1 further comprising a sound signal device connected to the second control unit.

5. The firearm stock of claim 1 further comprising a GPS receiver.

6. The firearm stock of claim 5 wherein the GPS receiver is connected to the second control unit.

7. The firearm stock of claim 1 wherein the warning piece comprises at least one display element connected to the second control unit.

8. The firearm stock of claim 7 wherein the display element is a LED.

9. The firearm stock of claim 7 wherein the warning piece comprises a plurality of display elements distributed throughout its perimeter.

10. The firearm stock of claim 7 wherein the warning piece is ring-shaped and allows the coupling of the body of the firearm therein for joining with the stock.

11. Firearm stock comprising:
    a first control unit being an electronic control unit,
    a stock comb;
    a receptacle with at least one opening disposed in the stock comb and which is configured to receive a display device,
    a display device which is housed in the receptacle and comprising a screen which is situated in the opening of the stock comb, disposed flush with the stock comb, the display device being completely housed in the receptacle,
    a battery configured to be connected to the display device,
    a second control unit configured to receive data from the first control unit and send it to the display device,
    a warning piece which is joined to a front part of the stock in the junction with the body of the firearm, wherein the warning piece comprises at least one display element connected to the second control unit.

12. Firearm stock comprising:
    a first control unit being an electronic control unit,
    a stock comb;
    a receptacle with at least one opening disposed in the stock comb and which is configured to receive a display device,
    a display device which is housed in the receptacle and comprising a screen which is situated in the opening of the stock comb, disposed flush with the stock comb, the display device being completely housed in the receptacle,
    a battery configured to be connected to the display device,
    a second control unit configured to receive data from the first control unit and send it to the display device,
    a warning piece which is joined to a front part of the stock in the junction with the body of the firearm, wherein the warning piece comprises at least one display element connected to the second control unit, and wherein the warning piece is ring-shaped and allows the coupling of the body of the firearm therein for joining with the stock.

* * * * *